United States Patent [19]

Steinberg

[11] 4,257,404
[45] Mar. 24, 1981

[54] REFLECTOR CONNECTORS

[76] Inventor: Hy Steinberg, 7200 NW. 78th St., Tamarac, Fla. 33319

[21] Appl. No.: 47,135

[22] Filed: Jun. 11, 1979

[51] Int. Cl.³ .............................................. F24J 3/02
[52] U.S. Cl. ................................. 126/451; 126/438; 350/292
[58] Field of Search ............... 126/438, 451, 450, 439; 350/292, 299; 220/80; 217/69; 24/81 B, 81 DM, 81 PB; 52/282

[56] References Cited

U.S. PATENT DOCUMENTS

| | | | |
|---|---|---|---|
| 2,388,297 | 11/1945 | Slaughter | 217/69 |
| 2,586,583 | 2/1952 | Wagner | 126/438 |
| 3,301,171 | 1/1967 | Steinberg | 126/451 |
| 3,896,786 | 7/1975 | Clevett | 126/438 |
| 3,989,157 | 11/1976 | Veenema | 220/80 |

Primary Examiner—James C. Yeung
Attorney, Agent, or Firm—Malin & Haley

[57] ABSTRACT

An interlocking reflector panel guide for rigidly fixing the angular relationship of foldable, extendable reflector panels with respect to a flat collector plate. The rigid reflective extension panels surround the open side of a solar oven and are fixed in their angular relationship with respect to the collector plate by double channel guide members which mate with the edges of the reflective panels. The double channel guide members have a locking portion which maintains the reflective panels in the proper position when the oven is in use, yet allows the reflective panels to be unlocked and folded or removed for storage.

2 Claims, 1 Drawing Figure

REFLECTOR CONNECTORS

BACKGROUND OF THE INVENTION

This invention relates generally to improvements in solar ovens, and more particularly to an improved interlocking reflector panel guide for rigidly fixing the angular relationship of foldable, extendable reflector panels with respect to a collector plate.

In the past, solar ovens using reflective extension panels have had various means, such as hinges or grooves, which permitted the panels to be folded down flat or removed for storage when the oven is not in use. These ovens have also used snap-type clasps at the upper extremities of the reflective panels to maintain the panels in a position for use. However, due to the combination of wind forces and the weight of the panels themselves, the reflective panels become distorted and their angular relationship with the collector plate changes when the oven is in use. The change in angular relationship between the reflective panels and the collector plate reduces the amount of solar radiation reflected to the collector plate with a corresponding loss of temperature and efficiency in the solar oven.

SUMMARY OF THE INVENTION

The present invention relates to a new and improved interlocking reflector panel guide for a solar oven whereby the problems of the prior art as stated above are overcome.

In accordance with the present invention, rigid reflective extension panels surrounding the open side of a solar oven are fixed in their angular relationship with respect to a collector plate by double channel guide members which mate with the edges of the reflective panels. The double channel guide members have a locking portion which maintains the reflective panels in the proper position when the oven is in use, yet allows the reflective panels to be folded or removed for storage.

Accordingly, it is an object of the present invention to provide connecting means for reflective panels in solar ovens that will prevent distortion of the reflective panels when the solar oven is in use.

It is another object of the present invention to provide a locking means in conjunction with the connecting means to fix the position of the reflective plates at an ideal angular relationship with respect to the collector plate.

In accordance with these and other objects which will be apparent hereinafter, the instant invention will now be described with particular reference to the accompanying drawings.

DESCRIPTION OF THE PREFERRED EMBODIMENT

Figure 1:
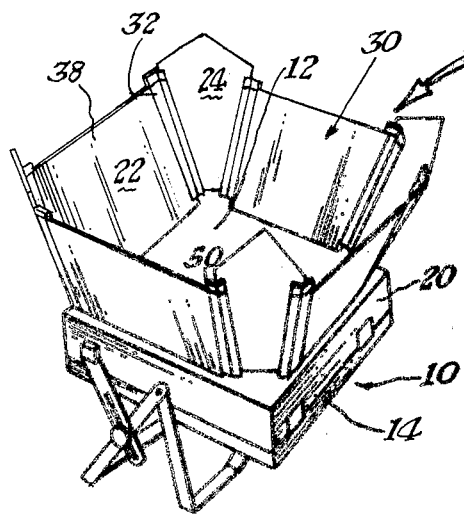
FIG. 1 is a perspective view of a solar oven embodying the present invention.

Referring now in detail to the drawings, wherein an embodiment of the present invention is shown, and referring particularly to FIG. 1, the solar oven, generally designated as numeral 10, is illustrated having a box-like casing 20 with an opening 12 in one end for receiving solar energy and a removable cover 14 at the opposite end for placing food to be cooked into a heating chamber. Surrounding the opening 12 and movably connected to the perimeter of the opening 12 is a reflector set 30. The reflector set 30 includes two generally rectangular reflective panels 22 and two generally trapezoidal reflective panels 24. The reflective panels 22 and 24 are substantially reflective extensions of the heating chamber within the box-like casing 20.

The vertical extending edges of the rectangular reflective panels 22 have a connecting portion 32 attached thereto. The connecting portion 32 is angularly disposed such that there are channel guides 34 and 36 which fasten over the vertical edge of the rectangular reflective panel 22 and the generally trapezoidal reflective panel 24, respectively. The connecting portion 32 may be fixedly and permanently attached by channel guide 34 to the rectangular reflective panel so that the trapezoidal panel 24 is movable in the channel guide 36. The angular displacement between the channel guides is generally 139 degrees, which disposes the rectangular reflective panels at 120 degrees to the collector plate, to allow maximum concentration of the solar radiation into the opening 12 and onto the collector plate in the heating compartment within the box-like casing 20.

The connecting portion 32 has an extension tab 42 protruding above the upper surface 44. This extension tab 44 generally extends above the upper edge 38 of the rectangular reflective panel 22.

The vertical extending edges of the generally trapezoidal reflective panels 24 have a locking portion 50 attached thereto. The locking portion 50 is disposed angularly similar to the connecting portion, that is, at substantially 139 degrees. The locking portion 50 has a single channel guide 52 which fastens permanently to the vertical edge of the trapezoidal reflective panels 24. The locking portion 50 has, however, an aperture 54 therethrough, which mates with the extension tab 42 on the connecting portion 32.

The connecting portion 32 may be continuous along the vertical edge of the rectangular reflective panel 22 or it may be a plurality of short strips, generally at the top and bottom of the reflective panels.

Figure 2:
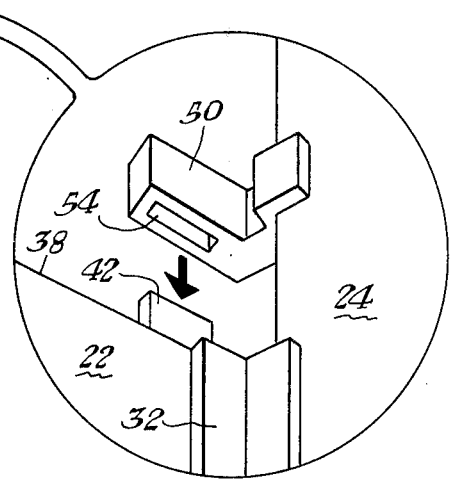
FIG. 2 is an enlarged side elevation of a solar oven partially broken away to better illustrate the present invention.
Figure 3:
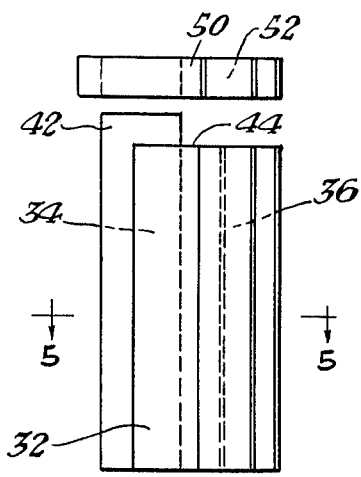
FIG. 3 is an elevational view of the present invention shown with the locking portion removed from the connecting portion.
Figure 4:
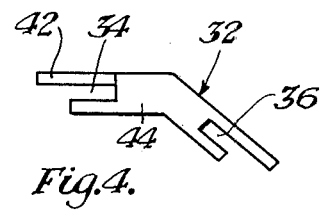
FIG. 4 is a top plan view of the connecting portion of the present invention.
Figure 5:
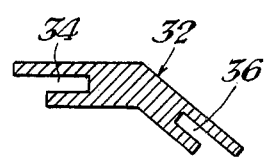
FIG. 5 is a cross-sectional view of the connecting portion of FIG. 3 taken along line 5—5.
Figure 6:
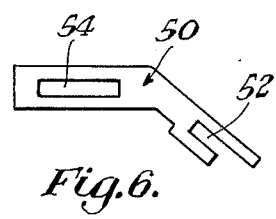
FIG. 6 is a top plan view of the locking portion of the present invention.

The connecting portion 32 may have one channel guide, for example guide 34, fixedly attached to one edge of the rectangular reflective panel 22, while the locking portion 50 has its channel guide 52 fixedly attached to the trapezoidal reflective panel 24, as illustrated in FIG. 2. As shown in FIGS. 1 and 2, the connecting portion 32 is fixed to the rectangular reflective panel 22 and the trapezoidal reflective panel has the locking portion 50 attached thereto, such that the apeture 54 fits over the tab 42 and thus the reflective panels are rigidly fixed in their angular relationship with respect to the collector plate within the box-like casing 20 so that the maximum amount of solar radiation is reflected onto the collector plate.

The components may be interchanged such as placing aperture 54 in member 3 (not shown), with mating tab 42 connected to member 50 (not shown).

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. In a solar oven including an insulated body defining a heating compartment with an opening at one end and an essentially flat collector plate connected within the heating compartment for receiving concentrated solar energy, and reflective panel means positionable at an angular relationship with the collector plate for concentrating substantially all of the solar energy entering the oven onto the collector plate, said reflective panel means having alternative rectangular members and trapezoidal members, the improvement comprising:

guide means for connecting adjacent edges of said alternate rectangular and trapezoidal members, said guide means having two opposed channel portions whereby adjacent reflective panels are in registry with respective channel portions; and means for securing said alternate reflective panel members to said guide means, said means for securing is a locking means, said guide means has an extension portion which removeably connects to said lock means.

2. In a solar oven as set forth in claim 1, wherein:

said extension portion of said guide means extends beyond the length of said adjacent edges of said reflective panel member.

* * * * *